(12) United States Patent
Taylor et al.

(10) Patent No.: US 9,785,959 B2
(45) Date of Patent: Oct. 10, 2017

(54) TRANSACTION CONNECTION MEDIATOR METHOD AND APPARATUS

(71) Applicants: Brett S. Taylor, Alpharetta, GA (US); Michael Cain Finley, Roswell, GA (US); Steven Thomas Latham, Johns Creek, GA (US); Christopher Anthony Lybeer, Suwanee, GA (US)

(72) Inventors: Brett S. Taylor, Alpharetta, GA (US); Michael Cain Finley, Roswell, GA (US); Steven Thomas Latham, Johns Creek, GA (US); Christopher Anthony Lybeer, Suwanee, GA (US)

(73) Assignee: NCR Corporation, Duluth, GA (US)

( * ) Notice: Subject to any disclaimer, the term of this patent is extended or adjusted under 35 U.S.C. 154(b) by 499 days.

(21) Appl. No.: 13/664,975

(22) Filed: Oct. 31, 2012

(65) Prior Publication Data

US 2014/0122097 A1  May 1, 2014

(51) Int. Cl.
*G06Q 30/00* (2012.01)
*G06Q 30/02* (2012.01)
*G06Q 30/06* (2012.01)

(52) U.S. Cl.
CPC ......... *G06Q 30/0207* (2013.01); *G06Q 30/06* (2013.01)

(58) Field of Classification Search
CPC ......... G06Q 20/40; G06Q 20/10; G06Q 40/00
See application file for complete search history.

(56) References Cited

U.S. PATENT DOCUMENTS

2008/0183627 A1* 7/2008 Harrison et al. ........ 705/67
2013/0080239 A1* 3/2013 Okerlund ............ 705/14.33

* cited by examiner

*Primary Examiner* — Shay S Glass
(74) *Attorney, Agent, or Firm* — Peter H. Priest; Schwegman, Lundberg & Woessner (57) ABSTRACT

An approach is provided for logically connecting customer endpoint devices to transaction services. The customer endpoint devices perform a customer purchase transaction and require access to transaction services to process payments and benefits that may be available for certain items. The customer endpoint devices use a transaction connection mediator to isolate communications with the transaction services.

20 Claims, 5 Drawing Sheets

TRANSACTION CONNECTION MEDIATOR METHOD AND APPARATUS

FIELD OF THE INVENTION

The present invention relates generally to electronic payment services. More particularly, but not exclusively, it relates to connecting customer endpoint devices performing a purchase transaction to payment services and to other services related to the items being purchased.

BACKGROUND

Any discussion of prior art throughout the specification should in no way be considered as an admission that such prior art is widely known or forms part of common general knowledge in the field.

A transaction service is a service, sometimes packaged as a product, which generally enables a purchase transaction by a customer or provides a possible benefit based on the items purchased. A payment transaction service is a type of transaction service that enables a purchase transaction by directly or indirectly providing an electronic payment for the purchase transaction. Indirectly providing payment means the service is linked to a credit or debit card that makes the payment. A digital wallet service or product is a form of payment transaction service. Examples of companies that provide payment transaction services are PayPal®, Kuapay®, VISA® (V.me®) and MasterCard® (PayPass®). In addition, companies like Google®, Apple, Microsoft®, Intuit® and Square® either have or plan to have a payment transaction service.

Another type of transaction service provides a benefit to a customer based on the items purchased by the customer. Loyalty programs are an example of one type of a benefit transaction service. Companies offer loyalty programs that are designed to reward and encourage customers that exhibit purchase behaviors that are beneficial to the companies. For a loyalty program to perform as designed, the program must be able to track customer purchases related to the program so it can identify purchase behaviors. All types of companies and organizations have implemented loyalty programs and most have their own unique system. The following are some examples of the types of businesses that have implemented loyalty programs: convenience stores, movie theaters, book stores, car rentals, airlines, grocery stores, DVD rentals, motels, hotels, fast food restaurants, gas stations, department stores and online retailers just to list a few.

Merchants can attract customers by making it easy for customers to select and use different payment products and by making it easy for a customer to quickly receive any benefits that may be available for the items being purchased. It is normal for a transaction service to charge a merchant a fee for each transaction and possibly a membership fee to use a transaction service. However, there is an additional indirect expense associated with supporting the different transaction services that is not related to these direct fees paid to the transaction services. The indirect expense relates to the cost of supporting software that can communicate and interact with each of the different transaction services. The indirect expenses include the cost of adding program support for a new transaction service which involves purchasing new software or updates to existing software plus the cost of installing and testing. Additionally, there is the cost of downtime during installation and the cost to train operators on the new software. There are also indirect costs associated with removing a transaction service.

SUMMARY OF THE INVENTION

Among its several aspects, the present invention seeks to overcome or ameliorate at least one of the disadvantages of the prior art, or to provide a useful alternative.

Among its several aspects, the present invention recognizes there is an advantage for an apparatus that supports merchants and that supports a set of transaction services where support for a new transaction service is added and made available to merchants without requiring merchants to update or install software to support the new transaction service.

Among its several aspects, one embodiment of the present invention is directed to an apparatus and method for connecting customer endpoint devices to a variety of different and changing transaction services using a transaction connection mediator. The customer endpoint devices are devices that support customer requested transactions such as a purchase transaction or a financial transaction or an information query transaction. Customer endpoint devices include point of sale (POS) terminals, self-service POS terminals, self-service kiosks, mobile computing devices, automatic teller machine (ATM) terminals, personal computers and other devices. Transaction services are used by the customer endpoint devices to perform or complete a customer requested transaction. Transaction services include, but are not limited to, digital wallet products, loyalty programs, offer engines, hotel management systems, travel systems and insurance systems that pay for covered items. The insurance systems may suitably support health, dental and drug coverage. In general, transaction services are products or services provided by different companies, organizations or government agencies. New transaction services are routinely released or updated.

Among its several aspects, one embodiment of the present invention discloses a transaction connection mediator that acts as an intermediary to isolate customer endpoint devices from a requirement to directly communicate with transaction services. The transaction connection mediator provides a common set of transaction commands that are used by software, such as a merchant application, executing on the customer endpoint devices to virtually communicate with any of the transaction services through the transaction connection mediator. The transaction connection mediator isolates the customer endpoint devices from the unique operation of each transaction service by translating in real-time each of the common set of transaction commands to the specific interface and equivalent commands supported by each transaction service. Therefore, changes to the operation of a current transaction service such as a new release or an update, or the addition of a new transaction service may require changes to the transaction connection mediator but not to the customer endpoint devices. In addition, the transaction connection mediator performs other services not directly requested by the customer endpoint devices such as gathering and sharing transaction data received from the customer endpoint devices with other transaction services.

For example, transaction data including information on items being purchased by a customer can automatically be gathered during the payment process or at any point during the purchase transaction. Information on items being purchased is then shared with one or more benefit transaction services that have a relationship with the customer without the customer endpoint device having to know of or communicate with the one or more benefit transaction services. Information identifying the one or more benefit transaction services is received from the initial payment transaction service identified for use to pay for the purchase. The payment transaction service while providing payment for the customer also maintains a record of customer provided information including information identifying other transaction services used by the customer to provide a benefit based on the items purchased. In addition, not all transactions involve a purchase but the payment transaction service may be still used to provide information on one or more benefit transition services.

In accordance with an embodiment of the present invention, there is provided a computer implemented method used by a transaction connection mediator to facilitate an electronic payment to a merchant for a purchase transaction by a customer using a first transaction service and to provide other benefits to the customer based on the items purchased. To this end, the method comprises: implementing a first transaction service interface to the first transaction service which provides electronic payments and wherein the interface communicates over the Internet with the first transaction service and supports a specific set of commands supported by the first transaction service; implementing a merchant interface where the interface communicates over the Internet with a merchant application executing on a customer endpoint device performing the purchase transaction; wherein the merchant interface receives a plurality of common transaction commands from the merchant application to perform the electronic payment for the purchase transaction; and wherein adding support for a new transaction service includes implementing a new transaction service interface to support the new transaction service but does not require changing the merchant interface or the merchant application.

A more complete understanding of the present invention, as well as further features and advantages of the invention, will be apparent from the following Detailed Description and the accompanying Drawings.

BRIEF DESCRIPTION OF THE DRAWINGS

The aspects of the claimed invention can be better understood with reference to the Drawings and the Detailed Description. The Drawings are not necessarily drawn to scale. Throughout the Drawings, like element numbers are used to describe the same parts throughout the various drawings, figures and charts.

DETAILED DESCRIPTION

In the following description, numerous details are set forth to provide an understanding of the claimed invention. However, it will be understood by those skilled in the art that aspects of the claimed invention may be practiced without utilizing all of these details and that numerous variations or modifications from the described embodiments are possible and envisioned.

Figure 1:
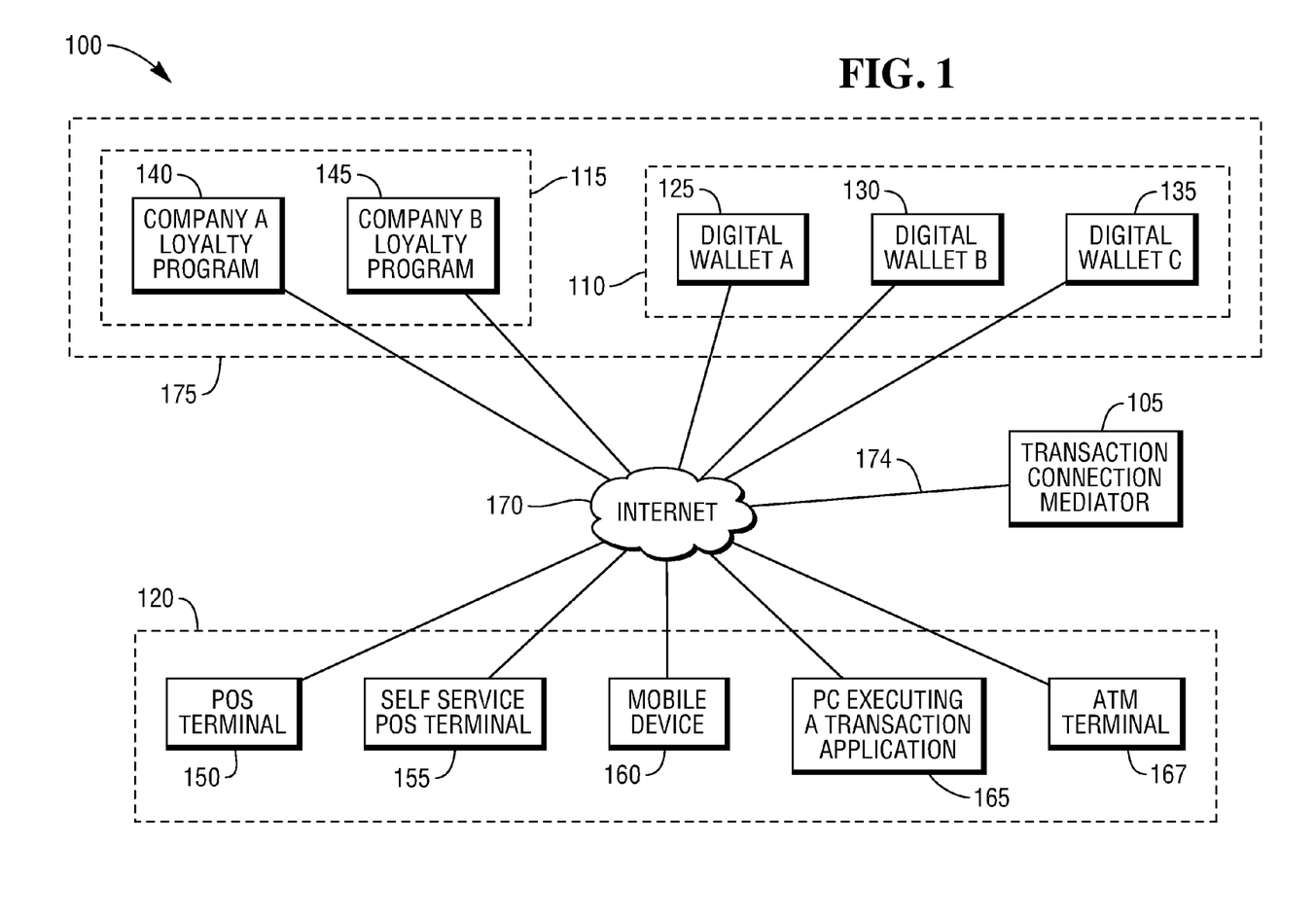
FIG. 1 is a high-level block diagram illustrating an exemplary embodiment of a transaction connection mediator system.

Referring now to FIG. 1, there is provided a high-level block diagram illustrating an exemplary embodiment of a transaction connection mediator system 100. The transaction connection mediator system 100 includes a transaction connection mediator 105, a plurality of customer endpoints 120 and a plurality of transaction services 175 that include a plurality of payment transaction services 110 in the form of digital wallet products and a plurality of benefit transaction services 115 in the form of loyalty programs.

The customer endpoint devices 120 are electronic devices either used by or for a customer to make a purchase or perform a financial or other type of transaction. The customer endpoint devices 120 include, but are not limited to, an assisted service point-of-sale (POS) terminal 150, a self service POS terminal 155, a mobile device 160, a personal computer (PC) 165 and an automatic teller machine (ATM) 167. Each customer endpoint device 120 communicates over the Internet 170 either directly or indirectly using one or more intermediate networks. Additionally, each of the customer endpoint devices 120 include a processor, a memory and a merchant application stored in the memory where when the merchant application is executed by the processor it causes the processor to implement a customer purchase transaction for a merchant that is selling the items being purchased. The merchant application may include a number of programs that control the hardware components of each customer endpoint device 120 and perform other functions related to the purchase transaction. In some embodiments, the customer endpoint devices 120 also include kiosks, such as a DVD kiosk, and self service gasoline pumps where a customer pays at the pump.

A transaction service is a service, sometimes marketed as a product, which enables a purchase transaction for a customer by providing payment or provides a possible benefit based on the items purchased. The purchase transaction may suitably include just a payment transaction or the identification of items for purchase and a payment transaction. A payment transaction may suitably include paying for a purchase and transferring money from account for the customer to an account for the merchant selling the items. A transaction service is provided by a service provider. Each of the transaction services 175 are connected to the Internet 170 and provide a transaction service either directly or indirectly to customers using the customer endpoint devices 120.

In some embodiments, additional service providers such as banks, credit card companies, insurance companies, government agencies and companies that maintain medical records provide additional transaction services 175. These additional transaction services 175 include banking services, payment for insured purchases, government services and access to healthcare records.

The benefit transaction services 115 include a loyalty program for company A 140 and a loyalty program for company B 145. Other embodiments include loyalty programs for other companies or organizations and different types of benefit programs. A loyalty program is a marketing tool used to reward customers for certain behaviors that benefit the company offering the loyalty program. The behaviors can include rewarding customers for continued purchases and driving customers to purchase new or different products.

Each loyalty program 140,145 includes a web site, accessible over the Internet 170, which communicates with customers about the loyalty program. Customers use a web browser to access each web site to view information about their account or the loyalty program. In some cases, customers may also enroll in the loyalty program through the web site.

The loyalty programs 140,145 further include an application software interface in addition to the standard web browser interface. The application software interface is used to communicate with remote applications that interface with the loyalty programs 140,145. The software interface may suitably be built on top of standard web communications protocols such as hypertext transfer protocol (HTTP). Examples of several software interfaces that are used are described below for the digital wallet products. The software interfaces are accessed over the Internet 170 and allow for the exchange of data between the remote applications and software that implements each loyalty program. Each software interface can be implemented using different protocols and functions. The remote applications can be software executing on a POS terminal or on the transaction connection mediator 105.

The data exchanged with the transaction services 175 provide information about customer activity. Customer activity includes information about items purchased, the location of the purchase which can be determined by a Global Positioning System "GPS" in a customer endpoint device 120 or from the known location of a fixed customer endpoint device 120, the price of the item, the total price of the purchase, tax, time and date of the purchase, type of customer endpoint 120 and method of payment.

In some embodiments, a loyalty program can in real-time extend a discount offer, such as a digital coupon, for an item being processed for purchase. Information identifying the customer and information about an item being purchased are communicated to the loyalty program prior to completion of the purchase transaction. If the offer rules are satisfied, the loyalty program will generate a discount offer for the item and send it for presentation to the customer. The customer may have multiple options regarding the discount such as using it for the current purchase or banking it for a future purchase or rejecting it if certain requirements are not acceptable to the customer.

In some embodiments, the benefit transaction services 115 include offer engines (not shown). An offer engine provides a discount or incentive to purchase a product typically based on products that are being purchased as part of a transaction. One difference between an offer engine and a loyalty program is that the offer engine usually does not use the identity of a customer to determine whether to extend an offer and usually does not have information that identifies a customer. Offer engines are typically trying to encourage a customer to try a product that may be new or not selling well. The offers are not based on the purchase history of the customer. Offer engines are usually not tied to a customer. Thus, it is the merchant that decides to subscribe to an offer engine and information about one or more offer engines is tied to the merchant.

Payment transaction services 110 include digital wallet products which are products provided by companies to electronically pay for a purchase transaction or to provide financial information that when used will cause an electronic payment to be made for a purchase transaction. A digital wallet product may provide for direct payment or may be linked to a credit or debit card that is used to make the payment. Digital wallet products can also cause money to be transferred to an account for a future purchase, for example for a prepaid cell phone. The payment transaction services 110 include a digital wallet A service 125, a digital wallet B service 130 and a digital wallet C service 135.

A digital wallet product can be provided by a company that is not a bank or credit card company. These types of digital wallet products include information that links to a credit card or debit card that is then used to transfer money to a merchant account and charge or debit a customer account. Banks and credit card companies can each provide a digital wallet product which directly causes the banks or credit card companies to transfer money to a merchant in response to a transaction made by a customer using the digital wallet product. Banks or companies that provide these types of digital wallet products are commonly known as acquiring institutions because they accept direct responsibility for processing a payment for a purchase transaction for the merchant.

Before a customer can use one of the digital wallet products 125, 130, 135, they must setup a digital wallet account. The account includes information that identifies the customer, the method of payments and information that identifies any benefit transaction services used by the customer. When a customer uses their digital wallet account to pay for a transaction, information identifying each of the customer's benefit transaction services is retrieved by the transaction connection mediator 105 and the benefit transaction services, such as the loyalty programs, are notified about relevant items being purchased.

This embodiment depicts three digital wallet products 125, 130, 135 but there are many other digital wallet products plus other types of payment products and new products are regularly announced. Each digital wallet product is accessible over the Internet 170 to both customers and software applications. Customers use a web browser to connect to a web site supported by each digital wallet product 125, 130, 135. Software applications use web based protocols that are built on top of standard protocols such as hypertext transfer protocol (HTTP) or secure hypertext transfer protocol (HTTPS). These protocols include simple object access protocol (SOAP) and extensible messaging and presence protocol (XMPP) and they are used to communicate with the functions of the digital wallet products and the loyalty products discussed above. While each digital wallet can perform similar functions at a high level, the specific functions and their interface are typically different for each digital wallet product. Software that interfaces to multiple digital wallets must include unique software that supports each of the digital wallet products. Additionally, changes to the interface for a digital wallet product will require changes to all software that directly interfaces to that digital wallet. This is also true for the loyalty programs or in some embodiments offer engines.

The loyalty programs 115 are popular marketing tools and there are thousands of different programs designed to reward a customer's behavior such as continuing to purchase a product or group of products. The loyalty programs 140, 145 are web based and use web interfaces like those described for the digital wallet products 125, 130, 135. The loyalty programs 140, 145 use a web page interface to communicate with customers so they can use a web browser to access information about a loyalty program and their account. The loyalty programs 140, 145 use the same application interfaces described above for the digital wallet products 125, 130, 135.

The transaction connection mediator (TCM) 105 is a software application that communicates over the Internet 170 with each of the digital wallets products 125, 130, 135, each of the loyalty programs 140, 145 and each of the customer endpoint devices 120. The TCM 105 includes unique software required to communicate with the functions of each of the digital wallet products 125, 130, 135 and each of the loyalty programs 140, 145. The TCM 105 further implements a set of common transaction commands that are translated into the specific functions of each of the digital wallet products 125, 130, 135 and each of the loyalty programs 140, 145.

Customer endpoint devices 120 use the common set of transaction commands and the TCM 105 to communicate with any of the transaction services 175 so that the customer endpoint devices 120 do not have to directly communicate with the transaction services 175. This provides a level of software isolation between the customer endpoint devices 120 and the transaction services 175. Customer endpoint devices 120 that use the TCM 105 do not have to be updated every time a new transaction service is released or when changes are made to current transaction services 175. This reduces the cost of maintaining the customer endpoint devices 120.

In some embodiments, the transaction connection mediator 105 is marketed using a model called Software as a Service (SAAS). Companies, such as merchants, that own or support customer endpoint devices purchase the services provided by the TCM 105. When the merchants purchase SAAS, they select the transaction services they already have an account with or plan to have an account with. An example of an embodiment of the TCM 105 marketed as SAAS is the NCR Aloha Connect® product.

Figure 2A:
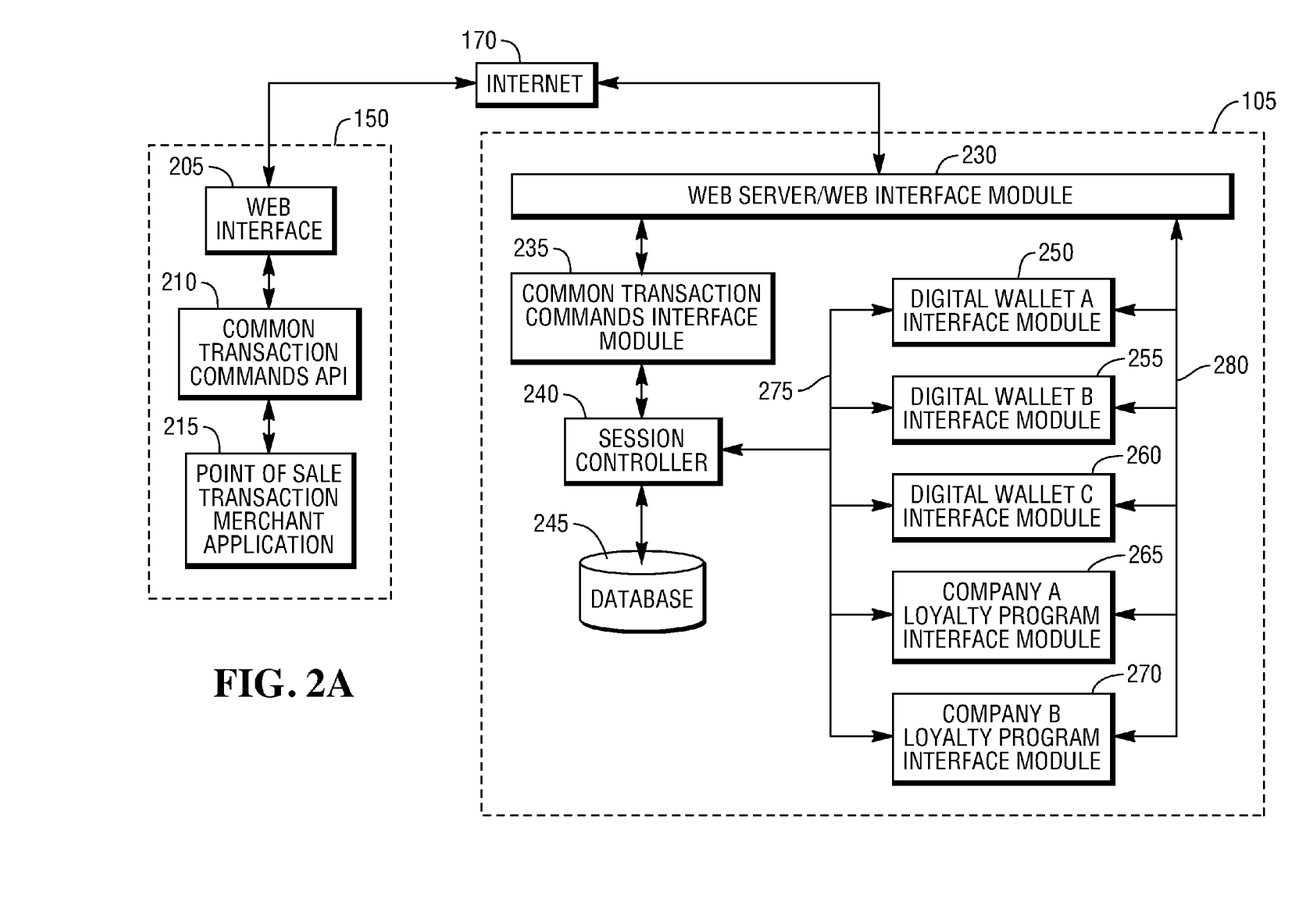
FIG. 2A is a high-level block diagram illustrating selected software and hardware components of an embodiment of the transaction connection mediator system of the present invention.

Turning now to FIG. 2A, there is provided a high-level block diagram illustrating selected software and hardware components of an embodiment of the transaction connection mediator system 100. Specifically, the figure depicts components of the transaction connection mediator 105 and the POS terminal 150. Also referenced is FIG. 2B which illustrates a high-level block diagram depicting software components of the digital wallet A interface module 250.

The POS terminal 150 includes a point of sale merchant application 215, a common transaction commands API 210 and a web interface 205. The POS merchant application 215 is software executed by a processor in the POS terminal 150 and when it is executed it causes the processor to control the features and functions of the POS terminal 150 that are used to perform a purchase transaction. The POS merchant application 215 is responsible for identifying the items presented for purchase and the price for each item. The POS merchant application 215 is also responsible for processing and receiving payment for the purchase. The payment may be in the form of cash, check, credit card, debit card or a web based electronic payment service, such as the digital wallet products 125, 130, 135.

For the electronic payment, the POS merchant application 215 uses a set of common transaction commands, implemented by the transaction connection mediator 105, to process the electronic payment through a payment transaction service 125, 130, 135. The set of common transaction commands includes a defined set of common payment commands that interface with any of the payment transaction services 125, 130, 135 and a defined set of common loyalty commands that interface to any of the loyalty products 140, 145. In some embodiments, the set of common payment commands includes a defined set of common offer engine commands used to communicate with offer engines.

The merchant application 215 uses a common transaction commands application program interface (API) 210 to execute each of the common transaction commands. When a request from the POS merchant application 215 to execute one of the common transaction commands is received, the common transaction commands API 210 communicates the request, information about the request and information about the requesting merchant to the transaction connection mediator 105 for execution. The transaction connection mediator 105 executes the requested common transaction command and transmits a response to the common transaction commands API 215 which returns it to the POS merchant application 215. The common transaction commands API 210 uses a web interface 205 to communicate of the Internet 170 with the transaction connection mediator 105.

The common transaction commands API 215 supports the interface to the set of common transaction commands which are independent of the actual transaction services 175 and do not change as a result of changing which transaction services 175 are used or as a result of changes to an interface to a specific transaction service. Therefore, the common transaction commands API 215 does not require updating because of changes to supported transaction services 175.

The common transaction commands support transactions with the digital wallet products 125, 130, 135 and with the loyalty programs 140, 145. In other embodiments, different types of transaction services 175 are supported and the common transaction commands include commands that support the additional types of services.

The common transaction commands API 210 uses the web interface 205 to communicate with the transaction connection mediator 105. In some embodiments, the common transaction commands API 215 is implemented as a Microsoft® Dynamic Linked Library (DLL).

The web interface 205 is software that implements a web services protocol stack that includes one or more of the following or similar protocols: hypertext transfer protocol (HTTP), secure hypertext transfer protocol (HTTPS), simple object access protocol (SOAP), JavaScript Object Notation (JSON) and extensible messaging and presence protocol (XMPP). The common transaction commands API 210 uses the web interface 205 to communicate with the transaction connection mediator 105 over the Internet 170.

The transaction connection mediator (TCM) 105 is software that executes on one or more server computers (FIG. 3, 300) and manages a logical transaction connection between a merchant transaction application such as the POS merchant application 215 and one of the payment transaction services 110. The TCM 105 includes a web server/web interface module 230 that implements a web services protocol stack. The protocol stack includes one or more of the following or similar protocols: hypertext transfer protocol (HTTP), secure hypertext transfer protocol (HTTPS), simple object access protocol (SOAP) and extensible messaging and presence protocol (XMPP). The web server/web interface module 230 communicates with the payment transaction services 110, the loyalty programs 140, 145 and the merchant application in each of the customer endpoint devices 120.

Figure 2B:
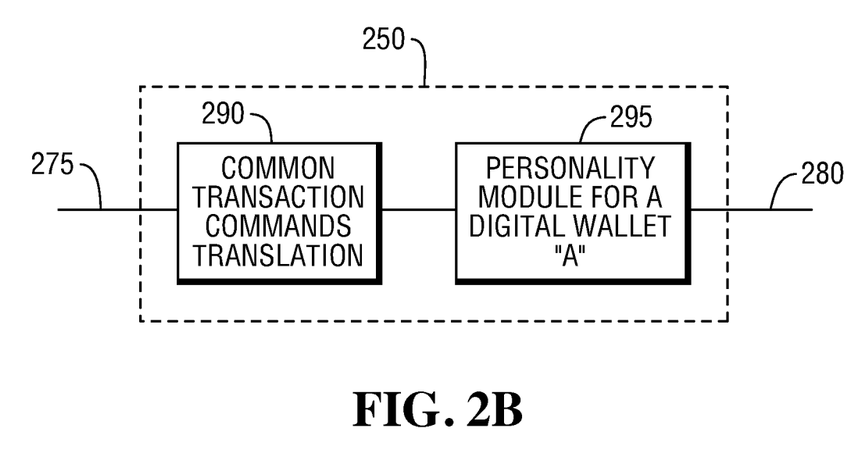
FIG. 2B is a high-level block diagram illustrating software components of the digital wallet A interface module of the present invention.

The TCM 105 supports a number of interface modules including a digital wallet A interface module 250, a digital wallet B interface module 255, a digital wallet C interface module 260, a company A loyalty program interface module 265 and a company B loyalty program interface module 270. Each interface module is designed to interface with a specific external product or program such as a digital wallet product or a loyalty program. Each supported digital wallet product and loyalty program has an interface module personalized to access the specific product or program. Each interface module is designed to use the proper protocols to interface with the required features or functions of the supported digital wallet product or loyalty program needed to perform the commands provided in the common transaction commands API 210. Each interface module includes unique personality software designed to communicate with a specific digital wallet product or a specific loyalty program. In FIG. 2B, the digital wallet A interface module 250 is depicted and it includes a personality module for the digital wallet A payment product 295 and a command transaction commands translation module 290. The translation module 290 receives a supported common transaction command and translates it into one or more commands supported by the digital wallet A product 125. The personality module for the digital wallet A receives the one or more commands and interfaces with the digital wallet A product 125 to execute them.

The TCM 105 further includes a common transaction commands interface (CTCI) module 235. The CTCI module 235 interfaces with the web server/web interface module 230 to communicate with the POS merchant application 215. The CTCI module 235 receives requests from the POS merchant application 215 to execute a common transaction command. The CTCI module 235 processes the request to check for proper syntax and identifies the resources required to implement the request, for example, the transaction service. If the request is proper, it is sent to a session controller module 240.

The session controller module 240 is responsible for creating sessions between the TCM 105 and the merchant application 215. The session controller module 240 is designed to manage a plurality of sessions between the TCM 105 and different merchant applications executing on different customer endpoint devices 120. A session is created or started when a command to start a session is received from the merchant application 215. In some embodiments, this causes an independent application thread to be started that executes a copy of the session controller module 240. Each session includes information that identifies the merchant and location of the customer endpoint device being used. The session controller module 240 also monitors the execution of each received common transaction command and sets timeout functions to determine if a command has failed to be properly executed. The transaction connection mediator 105 can execute a plurality of common transaction commands at one time between different customer endpoint devices 120 and transaction services 175 using multiple merchant sessions.

Figure 3:
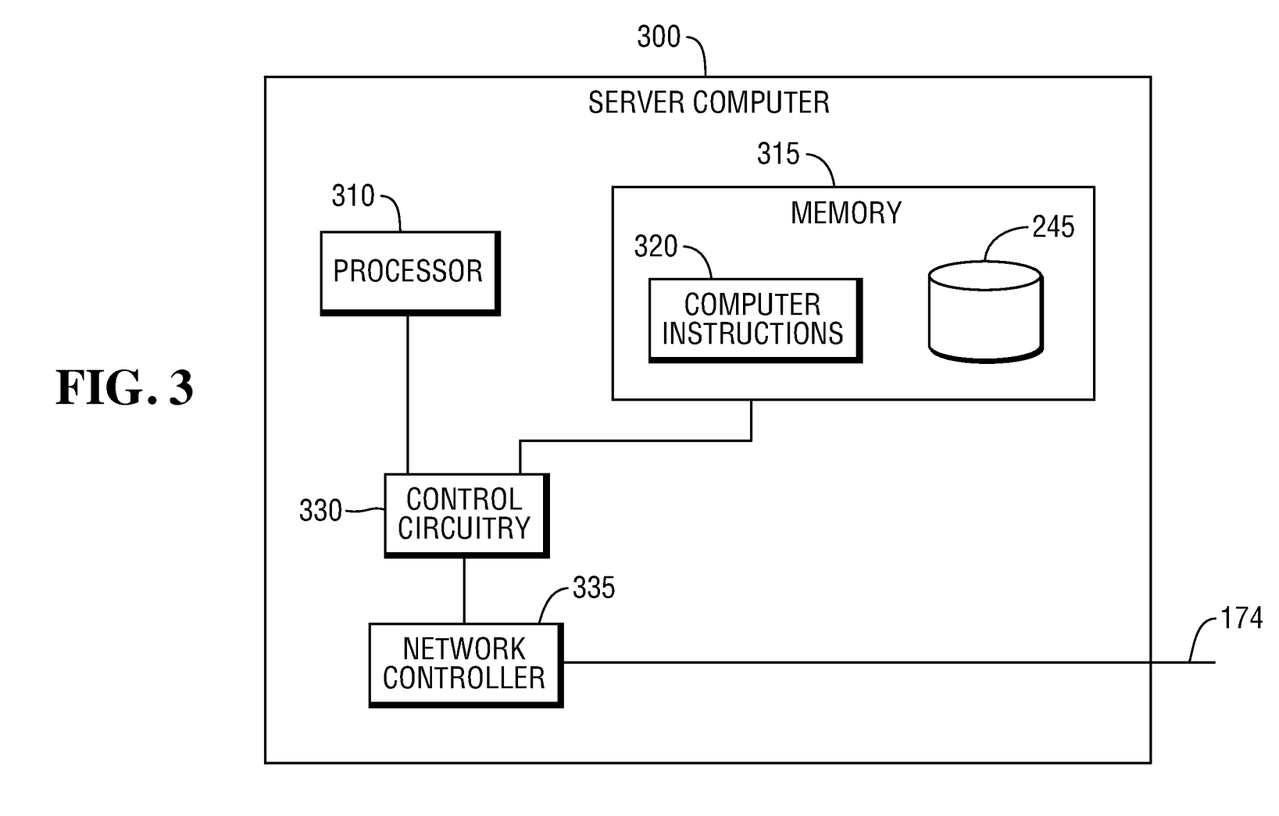
FIG. 3 is a high-level block diagram illustrating selected hardware components of a server computer that executes the transaction connection mediator of the present invention.

FIG. 3 is a high-level block diagram illustrating selected hardware components of a server computer that executes the transaction connection mediator 105. Multiple server computers 300 can be used to scale up the TCM 105 to handle a large number of customer endpoint devices 120 and transaction services 175. In some embodiments, the TCM 105 is divided into components and each component executes on a separate server computer 300. In other embodiments, there are multiple full copies of the TCM 105 and each copy executes on a separate server computer 300 but uses shared data.

The server computer 300 includes at least one processor 310, a memory 315, control circuitry 330 and a network controller 335. The control circuitry 330 allows the processor 310 to communicate with and control the memory 315 and the network controller 335.

The memory 315 uses non-transitory storage devices including both volatile and non-volatile memory. The non-volatile memory may include flash memory, other types of solid state electronic memory and rotating storage devices. Computer instructions 320 stored in the memory 315 are executed by the processor 310 and cause the processor 310 to control the devices attached to the server computer 300 and to provide the services and functions performed by the software elements of TCM 105. The database 245 is also stored in the memory 315.

The network controller 335 includes hardware and software required to communicate with a high speed network 174 which ultimately connects to the Internet 170.

Figure 4:
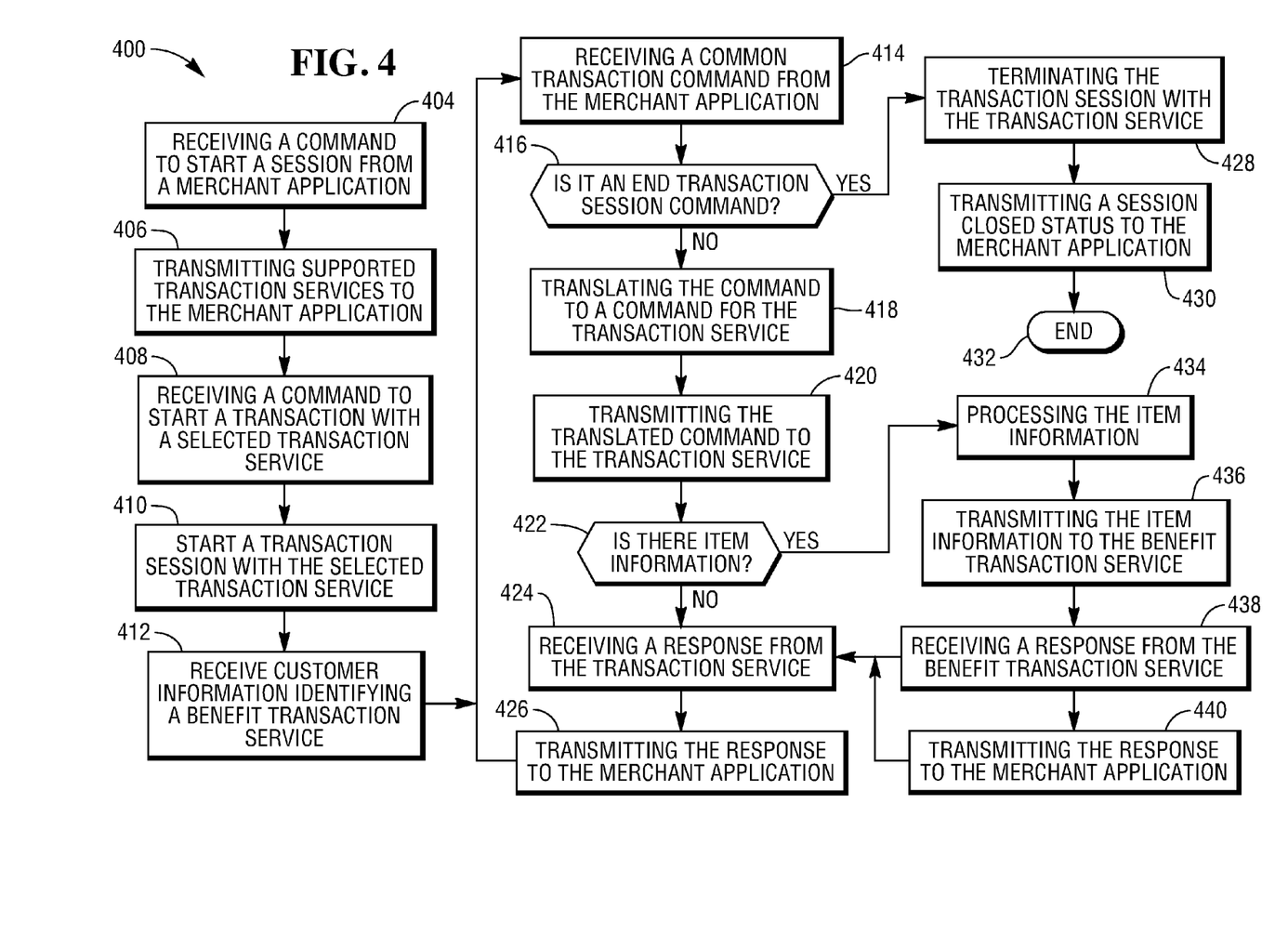
FIG. 4 is a high-level flow chart illustrating an exemplary method for operating the transaction connection mediator of the present invention.

Turning to FIG. 4, there is provided a high-level flow chart illustrating an exemplary method 400 for operating the transaction connection mediator (TOM) 105. This exemplary method 400 describes the interaction between the POS terminal 150, the transaction connection mediator 105, the digital wallet A 125 payment service and the company A loyalty program 140. The POS terminal 150 is performing a purchase transaction for a customer where the customer presents one or more items to the POS terminal 150 for identification and purchase. It should also be appreciated that this method 400 functions with any of the customer endpoint devices 120 disclosed herein plus other customer endpoint devices 120 not specifically disclosed. Additionally, the method 400 further functions with any of the transaction services 175 plus other transaction services not specifically disclosed. All potentially sensitive information transmitted to or from the TCM 105 preferably encrypted to protect the information. This includes merchant, customer and transaction information. Communications between the TCM 105 and the customer endpoint devices 120 and the transaction services 175 is accomplished by using the Internet for at least a portion of the transmission path.

At step 404, the transaction connection mediator (TCM) 105 receives a command to start a session from the merchant application 215 executing on the POS terminal 150. This is referred to as a merchant session between the merchant application executing on the customer endpoint device 120 and the TCM 105. The start session command includes information that securely and uniquely identifies the merchant making the sale to the customer and the location of the POS terminal 150. When the customer endpoint device 120 is a mobile device and has the ability to determine its location, for example by an onboard GPS system, the current location of the device is included in the start session command. Each merchant establishes a merchant account with the TCM 105 prior to using the TCM 105. Each merchant account includes information that uniquely identifies the merchant and a list of transaction services that the merchant has accounts with and currently has selected to use. The merchant account further includes information identifying bank accounts used to receive financial payments from a transaction service. In some embodiments, the start session command causes the TCM 105 to request a password or security tokens from the merchant application 215 to verify the identify of the merchant. The session is only started if the merchant is authenticated.

At step 406, the TCM 105 retrieves the merchant account information for the merchant. In some embodiments, the merchant accounts are stored in the database 245. The TCM 105 creates a message that includes all the current transaction services 175 listed in the merchant account. Some transaction services 175 may be listed in the merchant account but are not active and are not used. These are the current transaction services 175 that can be used by the merchant application. The TCM 105 transmits the message listing the current transaction services 175 to the merchant application 215.

It should be understood that the merchant may at any time add transaction services to the list of the current transaction services 175 or remove transaction services from the list of current transaction services 175. The only restriction to adding a transaction service is that the TCM 105 must have a personality module that supports the transaction service. For example, in FIG. 2A, elements 250,255,260,265,270 are personality modules. The merchant application 215 is not modified when a change is made to the current transaction services 175 because the TCM 105 always provides a current list of transaction services 175. In some embodiments, the list of transaction services 175 transmitted by the TCM 105 includes trademarked information such as icons, text or images for each transaction service which can be displayed to the customer to aid the customer in selecting a transaction service.

At step 408, the TCM 105 receives a command from the merchant application 215 to start a transaction with a selected transaction service. In one embodiment, the merchant application 215 displays the list of current transaction services 175 to the customer and the customer selects one of the services that the customer has an account with. For example, digital wallet A 125 is a payment transaction service that the merchant has an account with and the customer also has an account with so the customer selects digital wallet A 125 as the selected transaction service.

At step 410, the TCM 105 then transmits a command to the digital wallet A service 125 to start a transaction session between the customer and the merchant. In some embodiments, transmitting the start transaction command, involves accessing a predetermined web page as if the customer was using a web browser. In other embodiments, transmitting the start transaction command, involves transmitting a command to a program interface of the transaction service. It is typical for a transaction service to require a customer to enter a username and password or some other security token or tokens before a transaction session can be established. After the TCM 105 transmits the start transaction command, the TCM 105 receives a request from the transaction service to provide the security token. The TOM 105 then transmits the request to the merchant application 215 to be displayed to the customer so the customer can enter the required security token or tokens. The merchant application then captures the customer input and sends it to the TCM 105 which then provides it to the transaction service.

At step 412, the transaction session with the transaction service 125 has been started. Either in response to starting the transaction session or in response to a command sent by the TCM 105, the TCM 105 receives a list of benefit transaction services for the customer from the transaction service 125. It is typical for a digital wallet service, such as digital wallet A 125, to allow a customer to maintain information that is not specifically related to payment information. For example, a customer will maintain a list of current loyalty programs used by the customer. In some embodiments, the customer will store information identifying their health and/or drug insurance in their account. The TCM 105 identifies which of the transaction services are supported by the TCM 105 and stores this information with information for the open session started in step 404.

At this point, the TCM 105 has started a merchant session with the merchant application 215 and started a transaction session with the transaction service 125 for the customer. Between step 414 and step 426, the TCM 105 receives a common transaction command from the merchant application 215 and processes the command. The process is described in further detail below. The present invention includes a set of common transaction commands created to standardize and simplify the interface to the different transaction services 175. By using the common transaction commands the merchant application 215 can communicate with and perform a transaction with any of the transactions services 175 supported by the TCM 105 without having to be programmed for the specific transaction service. Additionally, a merchant can quickly add or delete support for a transaction service through the TCM 105 without any program changes to their merchant application 215. This reduces the merchant's cost for supporting transaction services and reduces the time required to support a new transaction service.

At step 414, the TOM 105 receives a common transaction command from the merchant application 215. At step 416, the TCM 105 determines if the received command is an end transaction command and transfers control to step 428 if it is. Otherwise, control passes to step 418.

At step 418, the received common transaction command is translated into the equivalent transaction command for the selected transaction service 125. The TCM 105 includes a personality module for each of the supported transaction services 175. For the digital wallet A product 125, the digital wallet A interface module 250 is the personality module for this service. The personality module performs the translation.

At step 420, the translated transaction command is transmitted to the digital wallet A service 125 for processing.

At step 422, the TCM 105 determines if the received common transaction command includes information that identifies one or more items being purchased by the customer and if it does, control is transferred to step 434, otherwise control passes to step 424.

At step 424, the TCM 105 receives a response from the digital wallet A service 125 in response to transmitting the translated transaction command to the digital wallet A service 125 for processing. The definition for each common transaction command includes a definition for a common response for the command. The response for some common transaction commands is a simple acknowledgement while other common transaction commands cause data to be returned. The digital wallet A interface module 250 translates the received response into the format for the proper common transaction command response.

At step 426, the TCM 105 transmits the translated response to the merchant application 215 and transfers control to stop 414.

Control is transferred to step 428 when it is determined that an end transaction command is received from the merchant application 215. At step 428, the TCM 105 transmits a command to the digital wallet A service 125 to end the transaction. For some services, this may require transmitting and receiving a number of commands to a service to end the transaction.

At step 430, the TCM 105 transmits a session closed status to the merchant application 215 and closes the merchant session. Closing the merchant session includes updating local information, closing any records that may be open and freeing any resources assigned to the session.

At step 432, the TCM 105 ends processing for this session. In some embodiments, this includes terminating a programming thread that was created to process the session.

If information about one or more items being purchased is included in a common transaction command, control is transferred to step 434. When seeking payment for a purchase, the paying entity, such as a bank or credit card company, requires information about the items being purchased. This requires the merchant application 215 to send information that identifies each item or service being purchased.

At step 434, the TCM 105 processes the item information. In some embodiments, this includes storing a copy of the items being purchased by the customer. Processing the item information includes determining if the item relates to one of the transaction services used by the customer. For example, if the item is a product manufactured by company ABC and the customer is a member of company ABC's loyalty program and the TCM 105 supports company ABC's loyalty program transaction service then the TCM 105 would determine the item is related to that transaction service. In this case, the relationship is based on who manufactures the item. In another example, the item is a prescription drug. The TCM 105 identifies the item as a drug and then determines that the customer has a drug insurance plan and relates the item to the drug insurance plan. Information about the customer's drug insurance plan was received when the transaction with the selected transaction service was started in step 412. In this case, the relationship between the item and transaction service is based on the type or class of product, in this case a drug. It is possible to relate an item to multiple transaction services. For this method, the items are related to the company A loyalty program 140.

At step 436, the TCM 105 transmits the item and customer information to the company A loyalty program 140 using the company A loyalty program interface module 265.

At step 438, the TCM 105 receives a response from the company A loyalty program 140 using the company A loyalty program interface module 265. If the response does not require any action by the merchant or customer, control passes to step 424. In this case, the loyalty program 140 logged the purchase of the item but no offer is made to the customer as a result of the purchase. If the response does require an action by the merchant or customer, control passes to step 440. In this case, the loyalty program 140 logged the purchase of the item and determined that an offer should be provided to the customer. The response is translated into a common transaction command response. It should be understood that the merchant application 215 did not initiate the interaction with the benefit transaction service so the response is actually a notification of an event.

In cases where the benefit transaction service is an insurance plan and the item or service is an item covered by the insurance for the customer, the response will be a credit for all of or a portion of the cost of the item. The response will be sent to the customer and to the merchant for processing. Having a customer's insurance information handled in this manner allows a customer to use any pharmacy without having to provide insurance information to the pharmacy. The item could also be a payment to a doctor, dentist or hospital for a covered product or service and the item would be processed the same.

In step 440, the TCM 105 transmits the translated response to the merchant application 215. If the response represents a discount in the form of a coupon, the merchant application 215 presents the coupon to the customer for acceptance by the customer. If the customer accepts the coupon, the merchant application 215 processes the coupon. If the response is a credit, the merchant application 215 notifies the customer and processes the credit. Control passes to step 424 after transmission of the response.

Although particular reference has been made to an embodiments that include certain customer endpoint devices and certain transaction services and examples have been provided illustrating the invention, certain other embodiments, variations and modifications are also envisioned within the spirit and scope of the following claims.

We claim:

1. A computer implemented method used by a transaction connection mediator system to facilitate an electronic payment to a merchant for a purchase transaction by a customer using a first transaction service, the method comprising:
   implementing, within a transaction connection mediator system, a plurality of transaction service interfaces each with regard to a transaction service, the plurality of transaction service interfaces executed by a microprocessor of a server computer on which the transaction connection mediator system is deployed, the plurality of transaction service interfaces including a first transaction service interface to the first transaction service which provides electronic payments according to data and commands received from the first transaction service interface and wherein the first transaction service interface communicates via a network interface device of the transaction connection mediator system server computer over the Internet with a server computer on which the first transaction service executes and the first transaction service interface supports a specific set of commands supported by the first transaction service, the first transaction service interface:
   supporting a set of common transaction commands;
   receiving one of the common transaction commands;
   translating the received command to one or more of the set of commands supported by the first transaction service; and
   transmitting the one or more translated commands to the first transaction service for execution;
   implementing, within the transaction connection mediator system, a plurality of merchant interfaces including a first merchant interface where the first merchant interface communicates via the network interface device of the server computer on which the transaction connection mediator is deployed over the Internet with a first merchant application executing on a customer endpoint device performing the purchase transaction;
   wherein the first merchant interface receives a plurality of common transaction commands via a network interface device over the Internet from the first merchant application executing on the customer endpoint device to perform the electronic payment for the purchase transaction;
   wherein the first merchant interface and the plurality of transaction service interfaces of the transaction connection mediator system execute on the server computer of the transaction connection mediator system to provide the customer endpoint device of a merchant associated with the first merchant interface access to each of the transaction services; and
   wherein adding support for a new transaction service includes implementing a new transaction service interface to support the new transaction service but does not require changing the first merchant interface or the first merchant application that executes on the customer endpoint device.

2. The method of claim 1, where implementing the first merchant interface comprises:
   receiving a request to start a payment session wherein the request includes information that identifies the first merchant and the customer endpoint device;
   receiving a common transaction command from the first merchant application for the first transaction service;

sending the common transaction command to the first transaction service interface for translation and transmission to and execution by the first transaction service;

receiving a response from the first transaction service and transmitting the response to the first merchant application;

repeating the prior three steps until the payment session is ended.

3. The method of claim 2, where implementing the first merchant interface further includes:

transmitting to the first merchant application, in response to the start payment session request, a list of transaction services the first merchant is authorized to use.

4. The method of claim 2, wherein the received common transaction command includes information about items being purchased.

5. The method of claim 4, therein the information received about items being purchased is stored in a database.

6. The method of claim 4, wherein one of the received common transaction command is a customer login command that includes information required to access information in a first customer account on the first transaction service for the customer performing the purchase transaction.

7. The method of claim 6, where implementing the first merchant interface further includes:

receiving from the first transaction service, information from the customer account including information identifying a second customer account for the customer on a second transaction service.

8. The method of claim 6, further including:

implementing a second transaction service interface to the second transaction service and wherein the interface communicates over the Internet with the second transaction service and supports a specific set of commands supported by the second transaction service.

9. The method of claim 8, where implementing the first merchant interface further includes:

transmitting information about the items being purchased by the customer to the second transaction service using the second transaction service interface where the second transaction service is a loyalty program and where the customer is identified using the information identifying the second customer account.

10. The method of claim 9, where implementing the first merchant interface further includes:

receiving an electronic discount coupon from the second transaction service for an item being purchased; and transmitting the electronic discount coupon to the first merchant application for use in the purchase transaction.

11. The method of claim 1, where the customer endpoint device is a point of sale terminal executing the first merchant application to perform the purchase transaction for the customer.

12. The method of claim 1, where the customer endpoint device is a cell phone executing the first merchant application to perform the purchase transaction for the customer.

13. The method of claim 1, where the customer endpoint device is an automatic teller machine executing the first merchant application to make a payment.

14. The method of claim 1, where the first transaction service is a financial acquirer.

15. The method of claim 14, where the first transaction service is a digital wallet service where each customer of the digital wallet service has a customer account that includes financial information used to make a financial transaction and information about the customer.

16. The method of claim 15, where each customer account further includes information identifying loyalty programs the customer is enrolled in.

17. The method of claim 15, where each customer account further includes customer healthcare information where the customer healthcare information includes information identifying a healthcare transaction service used by the customer.

18. The method of claim 17, where the healthcare transaction service is linked to healthcare insurance used by the customer and where information about each healthcare related item in the purchase transaction is transmitted to the healthcare transaction service and linked to the customer's healthcare insurance.

19. One or more non-transitory digital storage media storing instructions which, when executed by one or more computing devices, cause performance of the method recited in claim 1.

20. A computer apparatus comprising:

a network controller in communication with the Internet where the network controller sends and receives data to a plurality of computing devices where the Internet provides at least a portion of the communications path used to send and receive data;

a memory wherein software is stored;

a processor in communication with the network controller and the memory, where when the processor executes the software the processor performs functions of a transaction connection mediator that include:

implementing a plurality of transaction service interfaces each with regard to a respective transaction service, the plurality of transaction service interfaces including a first transaction service interface to a first transaction service which provides electronic payments according to data and commands received from the first transaction service interface that are transmitted via the network controller and wherein the first transaction service interface communicates via the network controller over the Internet with the first transaction service and the first transaction service interface supports a specific set of commands supported by the first transaction service, the first transaction service interface:

supporting a set of common transaction commands;

receiving one of the common transaction commands;

translating the received command to one or more of the set of commands supported by the first transaction service; and transmitting the one or more translated commands to the first transaction service for execution;

implementing a plurality of merchant interfaces including a first merchant interface where the first merchant interface communicates over the Internet via the network controller over the Internet with a first merchant application executing on a customer endpoint device performing a purchase transaction;

wherein the first merchant interface receives a plurality of common transaction commands via the network controller via the Internet from the first merchant application executing on the customer endpoint device to perform an electronic payment for the purchase transaction;

wherein the first merchant interface and the plurality of transaction service interfaces provide the customer endpoint device of a merchant associated with the first merchant interface access to each of the transaction services; and wherein adding support for a new transaction service includes implementing a new transaction service interface to support the new transaction service but does not require changing the first merchant interface or the first merchant application that executes on the customer endpoint device.

* * * * *